US00RE43069E

(19) United States
(12) Reissued Patent
Lee

(10) Patent Number: US RE43,069 E
(45) Date of Reissued Patent: Jan. 3, 2012

(54) METHOD FOR CONTROLLING HOME NETWORK SYSTEM

(75) Inventor: Jea Sung Lee, Daegu (KR)

(73) Assignee: LG Electronics Inc., Seoul (KR)

(21) Appl. No.: 13/012,684

(22) Filed: Jan. 24, 2011

Related U.S. Patent Documents

Reissue of:
(64) Patent No.: 7,483,954
Issued: Jan. 27, 2009
Appl. No.: 10/407,225
Filed: Apr. 7, 2003

(30) Foreign Application Priority Data

Aug. 26, 2002 (KR) ..... 10-2002-0050597

(51) Int. Cl.
*G06F 15/16* (2006.01)
*G06F 15/173* (2006.01)

(52) U.S. Cl. ..... 709/208; 709/203; 709/217; 709/223; 709/226

(58) Field of Classification Search ..... 709/203, 709/208, 217, 219, 223, 226, 231, 246
See application file for complete search history.

(56) References Cited

U.S. PATENT DOCUMENTS

| | | | | |
|---|---|---|---|---|
| 5,959,536 | A | 9/1999 | Chambers et al. | |
| 6,148,241 | A | 11/2000 | Ludtke et al. | |
| 7,039,858 | B2 * | 5/2006 | Humpleman et al. | 709/218 |
| 7,043,532 | B1 * | 5/2006 | Humpleman et al. | 709/208 |
| 7,103,834 | B1 * | 9/2006 | Humpleman et al. | 709/219 |
| 2002/0078259 | A1 * | 6/2002 | Wendorf et al. | 709/217 |
| 2002/0163534 | A1 * | 11/2002 | Choi et al. | 709/208 |
| 2002/0169845 | A1 * | 11/2002 | Szucs et al. | 709/223 |

FOREIGN PATENT DOCUMENTS

| | | | |
|---|---|---|---|
| CN | 1269033 | A | 4/2000 |
| DE | 199 29 933 | A1 | 1/2001 |
| EP | 1 069 500 | A1 | 1/2001 |
| WO | 98/59282 | | 12/1998 |
| WO | WO-99/35753 | A2 | 7/1999 |
| WO | WO-99/55070 | A2 | 10/1999 |

OTHER PUBLICATIONS

Evan, G. "Solving home automation problems using artificial intelligence techniques", Aug. 1991, IEEE Trans. on Consumer Electronics, pp. 395-400.*

Corcoran, P.M. et al. "Browser-style interfaces to a home automation network", Nov. 1996, IEEE Trans. on Consumer Electronics, pp. 1521-1527.*

Kim et al., Home Network Message Specification for White Goods and Its Applications: IEEE Transactions on Consumer Electronics, vol. 48, No. 1, Feb. 2002, pp. 1-9, XP002257089.

English language Abstract of WO 98/59282 published Dec. 30, 1998 (Corresp. U.S. Appl. Nos. 60/050,762 and 60/059,499).

* cited by examiner

*Primary Examiner* — Quang N. Nguyen
(74) *Attorney, Agent, or Firm* — Birch, Stewart, Kolasch & Birch, LLP

(57) ABSTRACT

A method of communicating between a first device and at least one second device, includes determining whether the at least one second device includes first individual user interface information and first function information; sending the first function information from the at least one second device to the first device if it is determined that the at least one second device includes the first function information; and performing communication between the first device and the at least one second device based on the received first function information.

21 Claims, 5 Drawing Sheets

METHOD FOR CONTROLLING HOME NETWORK SYSTEM

Matter enclosed in heavy brackets [ ] appears in the original patent but forms no part of this reissue specification; matter printed in italics indicates the additions made by reissue.

CROSS-REFERENCE TO RELATED APPLICATION

This application *is a Reissue Application of patent application Ser. No. 10/407,225 filed on 7 Apr. 2003, issued as U.S. Pat. No. 7,483,954 B1 on 27 Jan. 2009, and which* claims the benefit of the Korean Application No. P2002-50597 filed on Aug. 26, 2002, which is hereby incorporated by reference.

BACKGROUND OF THE INVENTION

1. Field of the Invention

The present invention relates to a home network system, and more particularly, to a method for controlling a home network system to automatically upload user interface (UI) and function information of slave appliances to a master appliance and a personal video recorder (PVR) to use the uploaded information.

2. Discussion of the Related Art

In earlier stages of the development of home automation systems that automatically control various kinds of appliances in a home or at a place far away from a home, each appliance was controlled independently through a telephone line or infrared rays. However, such appliances could not be controlled as a group even if they were in some way associated with one another. In more recent years, home network systems have been developed in which a network is constructed among the respective home appliances using a communication means and in which a controller is provided to control and manage the appliances.

FIG. 1 is a schematic block diagram of a background art home network system. FIG. 2 is a block diagram illustrating a master appliance that uploads UI and function information of a slave appliance in the background art home network system shown in FIG. 1. As shown in FIG. 1, a home network is constructed by connecting a plurality of home electronic appliances such as, for example, refrigerators, air conditioners, microwave ovens, washing machines, and personal computers (PCs) through a communication bus.

The microcomputers included in many home appliances have serial communication capabilities, and they can communicate with other microcomputers or appliances. Memories can be used in the microcomputers having sizes that vary according to the characteristics of the appliances.

In a network that includes one or more PCs and their peripheral appliances or multimedia appliances including digital television receivers (DTVs), high-grade hardware specifications are adopted to operate their basic functions. Thus, a standard for a high-speed communication with a large amount of data is required.

However, in home appliances such as, for example, refrigerators, washing machines, microwave ovens, electric lamps, gas alarms, desk lamps, and boilers, microcomputers that have relatively low-grade functions of less than 8 bits are generally used in order to perform their storage and other functions. In a home network composed of such home appliances, a remote control that monitors the operating state of the appliances is the main device for managing the appliances in the network. Thus, a standard for communication using relatively small-scale microcomputer resources is required, unlike the network composed of a PC or multimedia-series appliances.

A home network control protocol (HNCP) is a communication standard that defines the connection method of signal lines and the order of signal flow for communication among appliances in the home network. Communications with other appliances or the Internet can be performed using a network manager that serves as a bridge between the HNCP and other external protocols to control the home network.

FIG. 1 shows a DTV as a master appliance that uses the HNCP standard. The HNCP standard is a home networking standard for performing communications between master appliances such as DTVss and slave appliances through the RS232C standard of a PLC modem using the existing power lines without incurring the cost of installing an additional line.

In the background art system, as shown in FIG. 2, the UI and function information used in communicating with a slave appliance 22 is basically predefined when a master appliance such as DTVs is developed, and is stored in an internal memory such as a flash ROM 23. Any additional UI or functions cannot be used without separate measurements. Thus, in order to use them, a separate procedure is used in upgrading the software of the master appliance 21.

As described above, according to the background art system, the UI and functions for communications with the slave appliances are predefined irrespective of the characteristics of the slave appliances. This means that only particular kinds of items and slave appliances can be used, and the independent UI and function information of the slave appliances should be stored in separate memories provided in the respective slave appliances.

The background art home network system and the operation method thereof have the following further problems and disadvantages. According to the background art system, since the UI and functions for communications with the slave appliances are predefined irrespective of the characteristics of the slave appliances, non-defined slave appliances cannot be used through the home network. This means that only particular kinds of items and slave appliances can be used, and it is difficult to use appliances in the home network system that may, for example, be a product of a different manufacturer and therefore be incompatible with one another. Also, in the event that the memory capacity of the master appliance is insufficient, the UI cannot be used.

SUMMARY OF THE INVENTION

Accordingly, the present invention is directed to a method for controlling a home network system that substantially obviates one or more problems due to limitations and disadvantages of the background art.

An object of the present invention is to provide a method for controlling a home network system that can automatically upload UI and function information of slave appliances associated with the home network system to a master appliance and a personal video recorder (PVR) to use the information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve this object and other advantages and in accordance with the purpose of the invention, as embodied and broadly described herein, a method of communicating between a first device and at least one second device is disclosed, including determining whether the at least one second device includes first individual user interface information and first function information; sending the first function information from the at least one second device to the first device if it is determined that the at least one second device includes the first function information; and performing communication between the first device and the at least one second device based on the received first function information.

In another aspect of the present invention, a method of communicating between a first device and at least one second device, including determining whether information stored in a memory of the at least one second device corresponds to an updated version of first user interface information and first function information of the at least one second device; sending the first function information from the at least one second device to the first device if it is determined that the at least one second device includes the first function information; and performing communication between the first device and the at least one second device based on the received first function information.

In yet another aspect of the present invention, a communication system includes a first device that determines whether at least one second device includes first individual user interface information and first function information, wherein the at least one second device sends the first function information to a storage area of the first device if it is determined that the at least one second device includes the first function information, and communication is performed between the first device and the at least one second device based on the sent first function information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The present invention discloses a system for uploading user interface (UI) and function (or operation) information stored in one or more respectively associated slave appliances to a storage area of a master appliance for interacting with each slave appliance. The present invention enables a master appliance to use individual UI and function information of the respective slave appliances and to directly interact with each slave appliance without any additional program upgrade process of the master appliance. When a protocol of a basic user interface and a slave user interface is established, an environment for enabling a master appliance to interact with appliances of a different manufacturer is provided.

Figure 1:
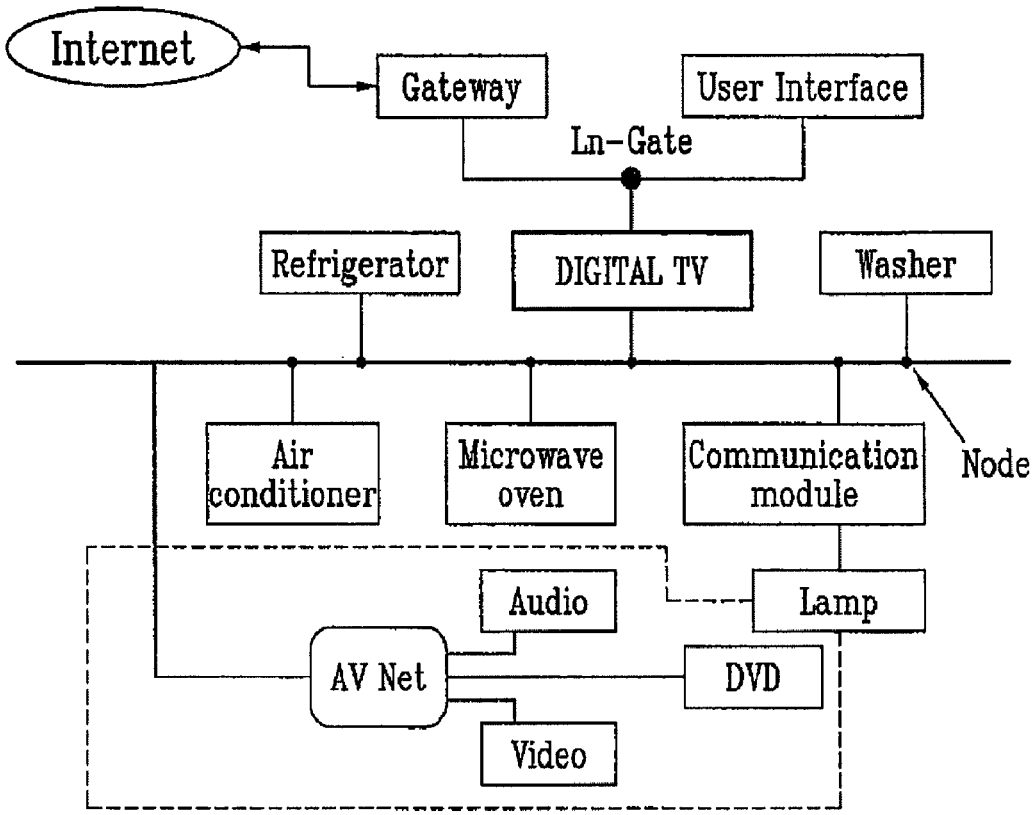
FIG. 1 Background Art
FIG. 1 is a schematic block diagram of a background art home network system.
Figure 2:
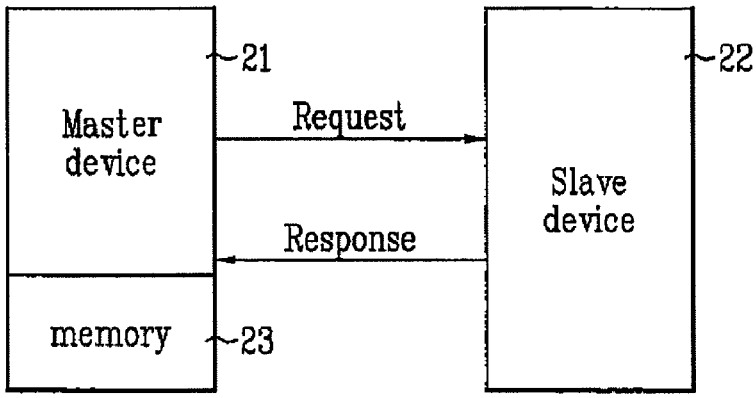
FIG. 2 Background Art
FIG. 2 is a block diagram illustrating a master appliance that uploads UI and function information from a slave appliance in the background art home network system.
Figure 3:
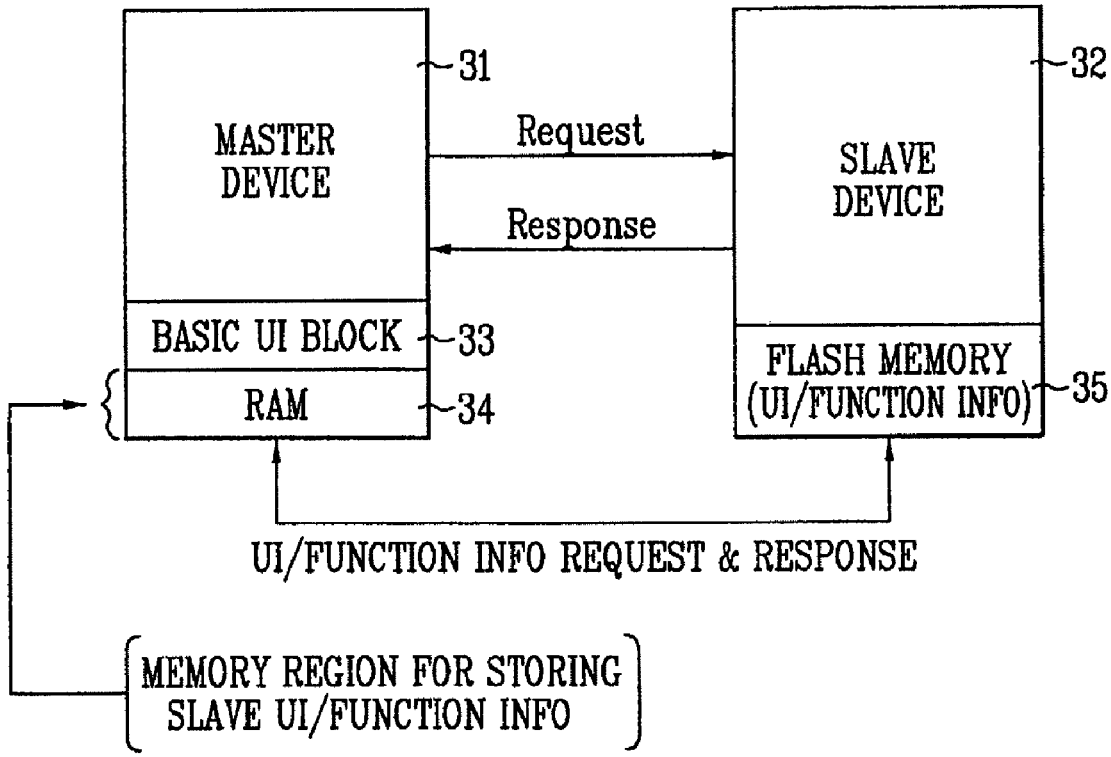
FIG. 3 is a block diagram illustrating a master appliance that uploads UI and function information from a slave appliance according to a first embodiment of the present invention.

FIG. 3 is a block diagram illustrating a home network system including a master appliance (or device) 31 that uploads UI and function information from a slave appliance 32 according to a first embodiment of the present invention. The home network system shown in FIG. 1 enables the master appliance 31 to interact with the slave appliance 32 using individual UI and function information of the slave appliance 32 without any additional program or data upgrade process. As shown in FIG. 3, the home network system includes a master appliance 31 for managing the communications on a home network. A basic user interface block 33 is provided in the master appliance 31 for storing basic information required for home networking. A slave UI and function storage area 34 stores slave UI and function information. A storage means 35, which may be a flash ROM for example, is provided in the slave appliance 32 for storing UI and function information of the slave appliance 32 itself and for responding in accordance with a request for the UI and function information of the slave UI and function storage area 34. Alternatively, one or more storage areas on a database server can replace the user interface block 33, the slave UI and function storage area 34 and the storage means 35 for storing the respective information. The database server can be connected to and accessible over the Internet.

According to the present invention, the master appliance 31 originally has only the basic user interface information, and the independent UI and function information of the respective slave appliance 32 is originally stored in a separate memory such as the flash ROM 35 in the respective appliance 32.

When the power of the master appliance 31 is turned on, it searches for the respective slave appliance 32, and uploads the UI and function information stored in the memory of the respective slave appliance 32 to the slave UI and function storage area 34 of the master appliance 31. Next, the master appliance 31 combines the information already stored in the basic user interface block 33 and the uploaded slave UI and function information, and uses the combined data for communicating with the slave appliance 32.

Figure 4:
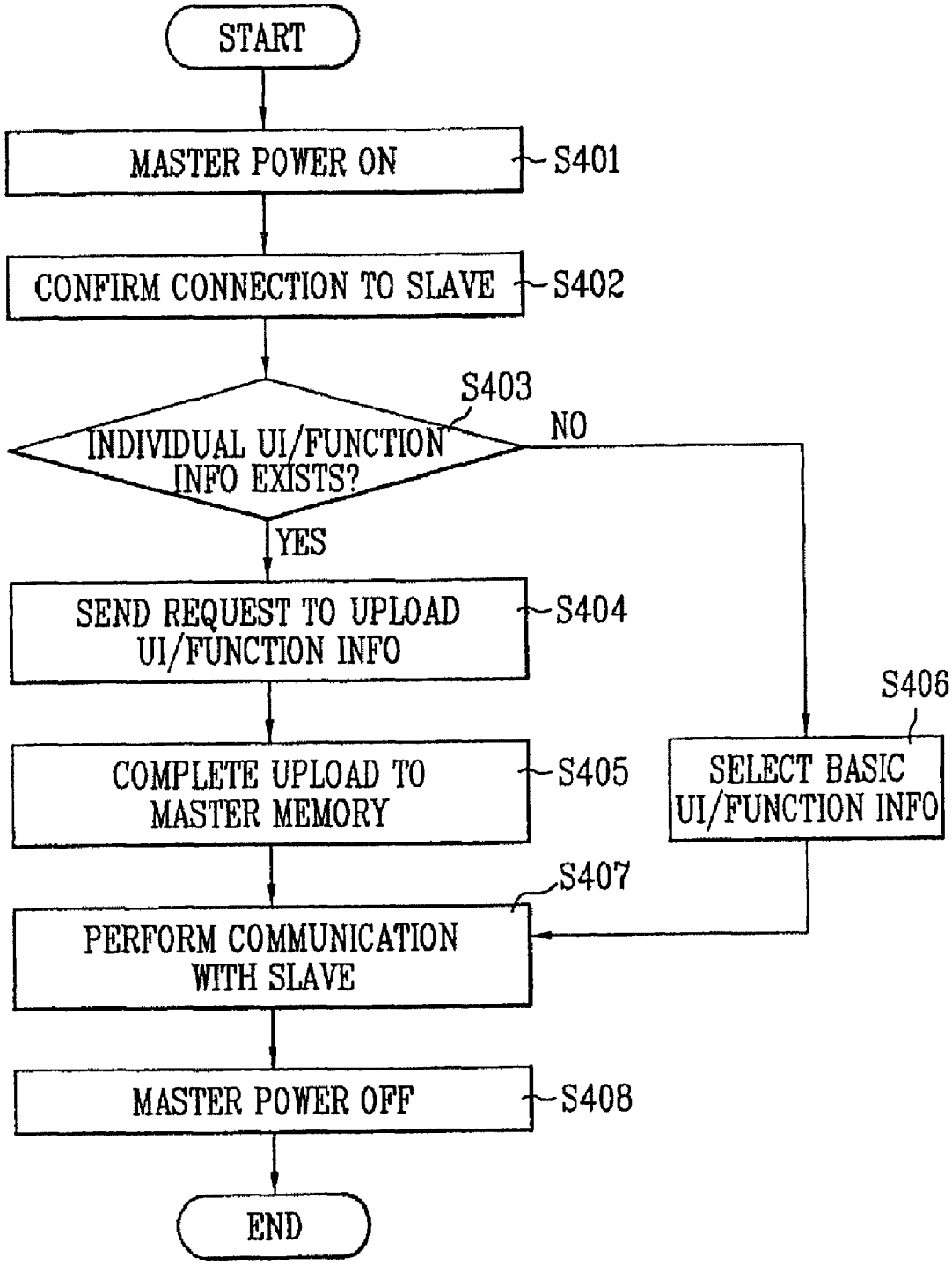
FIG. 4 is a flowchart illustrating a method of uploading of UI and function information from a slave appliance in a home network system according to a first embodiment of the present invention.

The method for controlling a home network system as constructed above according to a first embodiment of the present invention will now be described in detail. FIG. 4 is a flowchart illustrating the method of uploading UI and function information from a slave appliance in a home network system according to the first embodiment of the present invention. When the power of the master appliance 31 is turned on in step S401, it sets the basic settings such as an OS and HNCP modem activation. When the basic settings are completed, the master appliance 31 confirms the connection of the slave appliances 32 to a HNCP network in step S402. The confirmation of the connection can be made over the Internet in one aspect of the present invention.

Then, the master appliance 31 checks whether the respective slave appliance 32 connected to the network has individual UI and function information in step S403. If it is determined that the slave appliance 32 does not have individual UI and function information, the master appliance 31 selects and stores in the slave UI and function storage area 34 the basic UI and function information previously stored in the master appliance 31, and then performs communication with the slave appliance 32 using the selected information in steps S406 and S407.

On the other hand, if it is determined that the respective slave appliance 32 does have individual UI and function information, the master appliance 31 sends a request to the slave appliance 32 to upload the information in step S404, and the respective slave appliance 32 prepares the transmission of the information. Thereafter, the slave appliance 32 transmits the independent UI and function information to the master appliance 31, and the master appliance 31 receives the information and stores the received information in the slave UI and function storage area 34 in step S405. Finally, the master appliance 31 performs communication with the slave appliance 32 through the HNCP network in step S407. Accordingly, the user can perform communication with a slave appliance that has its own individual UI and function information using the uploaded UI and function information. Alternatively, the user can perform communication with a slave appliance that does not have independent UI and function information using the basic UI and function information predefined in the master appliance 31.

When the power of the master appliance 31 is turned on again after the entire operation is terminated and then the power is turned off, the master appliance 31 re-performs the above-described procedure since the individual UI and function information stored in the slave UI and function storage area 34 of the master appliance 31 gets deleted.

Figure 5:
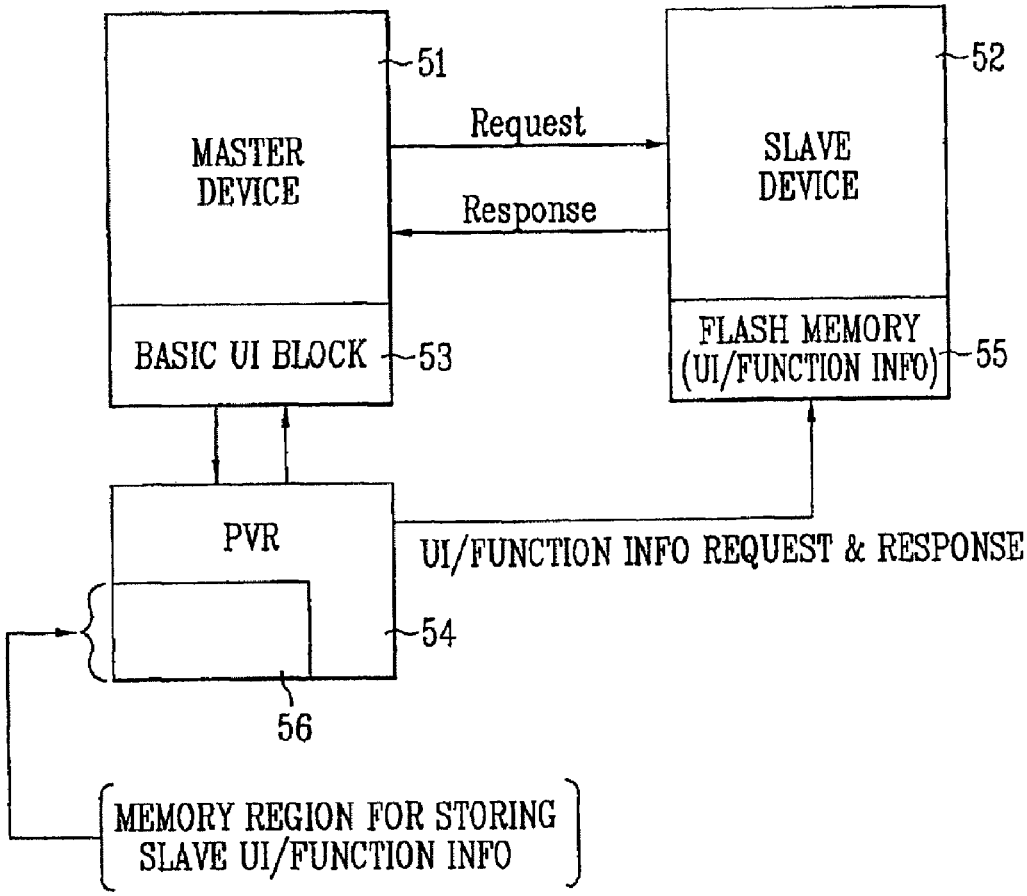
FIG. 5 is a block diagram illustrating a master appliance that uploads UI and function information from a slave appliance in a home network system according to a second embodiment of the present invention.

The home network system for communications with slave appliances having large-capacity UI and function information according to a second embodiment of the present invention is described with respect to FIG. 5. FIG. 5 is a block diagram illustrating a master appliance that uploads UI and function information from a slave appliance in a home network system according to the second embodiment of the present invention. The home network system according to the second embodiment of the present invention is for enabling communications with a slave appliance 52 using individual UI and function information of the slave appliance 52 without any additional program or data upgrade. As shown in FIG. 5, the home network system includes a master appliance 51 for managing the communications on a home network. A basic UI block 53 is provided in the master appliance 51 for storing basic information required for home networking. An external personal video recorder (PVR) 54 has a slave UI and function storage area 56 for storing slave UI and function information. A storage means, which may be a flash ROM 55 for example, is provided in the slave appliance 52 for storing UI and function information of the slave appliance 52 itself and for responding in accordance with a request for the UI and function information of the slave UI and function storage area 56.

According to the second embodiment of the present invention, the master device 51 originally contains only the basic user interface data, and the individual UI and function information of the respective slave appliance 52 is initially stored in the separate memory such as the flash ROM 55 in the respective appliance 52.

When the power of the master appliance 51 is turned on, it searches for the respective slave appliance 52, and uploads the UI and function information stored in the memory of the respective slave appliance 52 to the external storage area, that is, to the slave UI and function storage area 56. Next, the master appliance 51 combines the information in the basic user interface block 53 and the UI and function information in the slave appliance itself 52, and uses the combined data for communicating with the slave appliance 52.

In the home network system according to the second embodiment of the present invention, it is possible for the slave appliance 52 to perform uploading only once when it is initially installed, and for the master appliance 51 to load again the UI received from the external network to the slave appliance 52.

Figure 6:
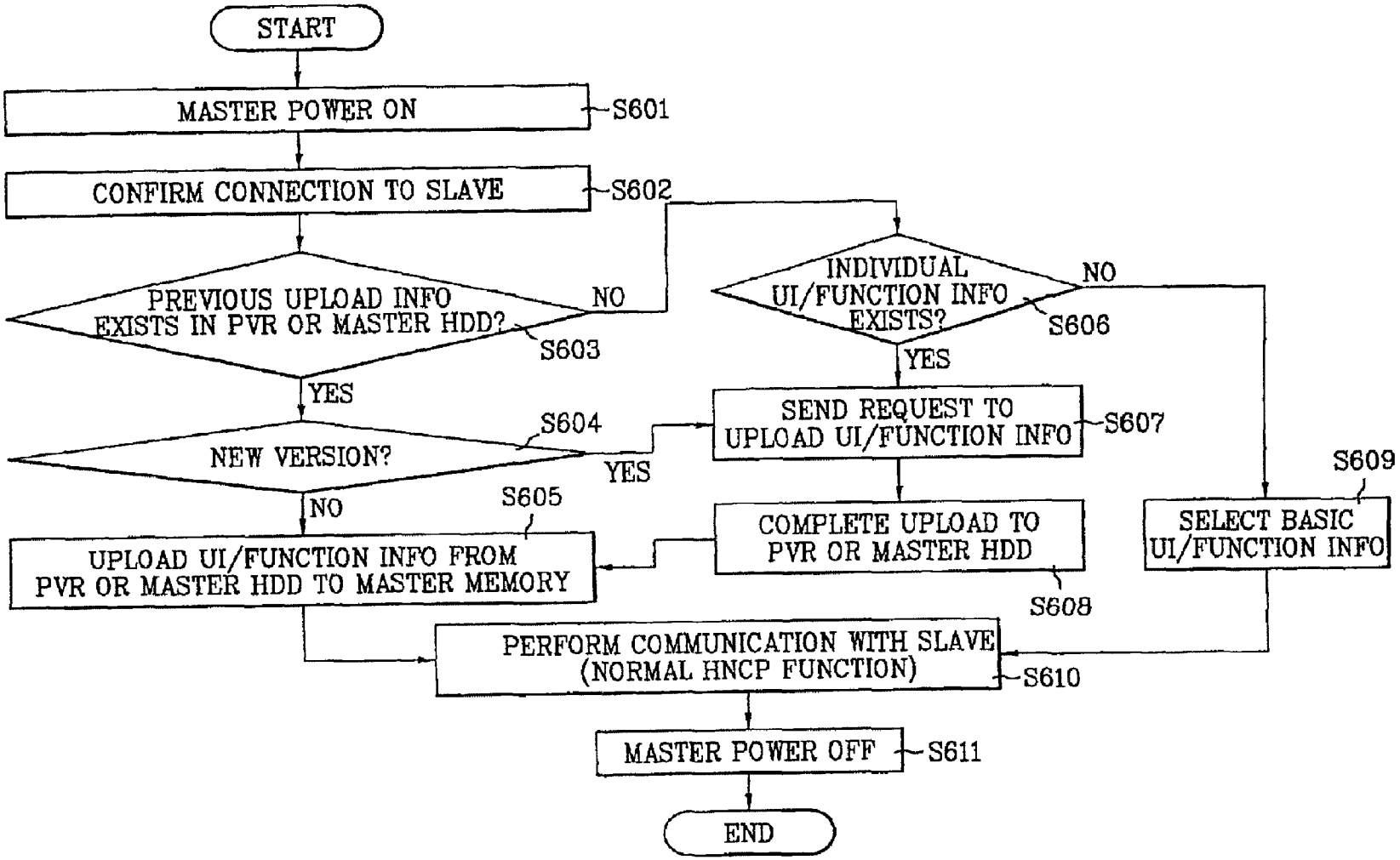
FIG. 6 is a flowchart illustrating a method of uploading of UI and function information from a slave appliance according to a second embodiment of the present invention.

The method for controlling a home network system as constructed above according to the second embodiment of the present invention will now be described in detail. FIG. 6 is a flowchart illustrating a method of uploading UI and function information from a slave appliance according to the second embodiment of the present invention. When the power of the master appliance 51 is turned on, it sets the basic settings such as an OS and HNCP modem activation in step S601. When the basic settings are completed, the master appliance 51 confirms the connection of the slave appliance 52 to a HNCP network in step S602.

After confirming the connection to the slave appliance 52, the master appliance 51 checks to determine the existence of the individual UI and function information previously uploaded from the slave appliance and stored in a PVR or a specified area of a built-in hard disc drive (HDD), that is, in the slave UI and function storage area 56, before the power is turned on in step S603.

If it is determined that the information is uploaded from the respective slave appliance and stored in the slave UI and function storage area 56 before the power is turned on, the master appliance 51 compares the version of the existing uploaded UI and function information with a version of the individual UI and function information currently stored in the memory areas of the respective slave appliances 52 in step S604. If the individual UI and function information stored in the memory areas of the slave appliances 52 corresponds to a new version, the master appliance 51 sends a request to the slave appliance 52 to upload the corresponding UI and function information in step S607, and uploads the individual UI and function information stored in the slave appliances 52 itself to the PVR or the master HDD in step S608. When the upload to the PVR or the master HDD is completed, the master appliance 51 uploads the uploaded UI and function information to the memory of the master appliance 51 in step S605.

On the other hand, if the individual UI and function information stored in the memory areas of the slave appliances 52 are determined not to correspond to a new version as a result of comparison at the version comparison step, the master appliance 51 directly performs step S605. In addition, if it is determined that there is no individual independent UI and function information uploaded from the respective slave appliance and stored in the slave UI and function storage area 56 before the power is turned on, the master appliance 51 determines whether the slave appliance itself has the UI and function information without performing the version comparison step in step S606.

If the slave appliance 52 does not have UI and function information, the master appliance 51 performs the communication by selecting and using the basic user interface and function information initially stored in the master appliance 51 in steps S609 and S610. Meanwhile, if the slave appliance 52 does have UI and function information, the master appliance 51 performs steps S607, S608 and S605.

If the UI and function information is secured through the above-described procedure, the master appliance 51 performs communication with the slave appliance 52 through the HNCP network in step S610. At this time, the user performs communication with a slave appliance that has independent UI and function information using the uploaded UI and function information. The user performs communication with a slave appliance that does not have independent UI and function information using the basic UI and function information predefined in the master appliance 51. As a result, when using the HNCP, the present invention can control appliances, which are not predefined in the master appliance, by uploading the UI and function information defined in the respective associated slave appliances to the DTV and the PVR and use the independent UI of each slave appliance.

The home network system and the method for controlling the home network system according to the present invention have the following advantages. In order to use UI and function information of a new slave appliance, the program or application of the master appliance does not need to be externally upgraded by a service man, but the UI and function information held in the respective slave appliances themselves are uploaded to the master appliance at the moment when the slave appliances are connected to the network, so that the control of the home network can easily be achieved. That is, diverse functions and the UI suitable for the respective slave appliances can be used without any separate external upgrading process. Also, even the large-capacity UI and function information can be used in accordance with the capacity of the PVR and the built-in HDD, and in case that only the fixed basic standard is defined, slave appliances of other manufacturers can be connected and used on the network.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A method of communicating between a first device and at least one second device, the method comprising:

prestoring in the first device an original version of first user interface information and first function information used in communicating with the at least one second device, the prestored information corresponding to a previous upload from a memory of the at least one second device;

comparing the original version of the first user interface information and the first function information prestored in the first device to first user interface information and first function information stored in the memory of the at least one second device to determine whether the first user interface information and the first function information stored in the memory of the at least one second device corresponds to an updated version of first user interface information and first function information for controlling the at least one second device;

sending the updated version of the first user interface information and the first function information from the at least one second device to the first device, if it is determined that the at least one second device includes the updated version of the first user interface information and the first function information for controlling the at least one second device;

performing communication between the first device and the at least one second device based on the updated version of the first user interface information and the first function information, if the updated version of the first user interface information and the first function information is received by the first device; and performing communication between the first device and the at least one second device based on the original version of the first user interface information and the first function information prestored in the first device, if it is determined that the at least one second device does not include the updated version of the first user interface information and the first function information for controlling the at least one second device, wherein the at least one second device is controlled based on one of the updated version of the first user interface information and the first function information and the original version of the first user interface information and the first function information, the one of the updated version of the first function information and the original version of the first function information controlling at least one function of the at least one second device based on the one of the updated version of the first user interface information and the original version of the first user interface information.

2. The method according to claim 1, further comprising:

confirming a connection between the first device and the at least one second device when power is supplied to the first device.

3. The method according to claim 1, wherein the first device and the at least one second device are parts of a home network control protocol (HNCP) network.

4. The method according to claim 1, further comprising prestoring in the first device basic user interface information and basic function information for controlling the at least one second device when the information prestored in the first device is deleted and the memory of the at least one second device does not have first user interface information and first function information.

5. The method according to claim 1, wherein the first user interface information and the first function information are deleted from the first device when power to the first device is turned off.

6. The method according to claim 1, wherein said comparing and said sending are performed automatically when the first device is powered.

7. The method according to claim 1, wherein the memory of the at least one second device is a storage area on a database server accessible over the Internet, wherein said comparing and said sending are performed over the Internet, and wherein the first device communicates with the at least one second device via a home network control protocol (HNCP) network.

8. A communication system comprising:

at least one second device; and a first device coupled to the at least one second device, the first device being configured to:

prestore in said first device an original version of first user interface information and first function information used in communicating with the at least one second device, the prestored information corresponding to a previous upload from a memory of the at least one second device, compare the prestored information in said first device to first user interface information and first function information stored in the memory of the at least one second device to determine whether the information stored in the memory of the at least one second device corresponds to an updated version of first user interface information and first function information for controlling the at least one second device, receive the updated version of the first user interface information and the first function information from the at least one second device, if it is determined that the at least one second device includes the updated version of the first user interface information and the first function information for controlling the at least one second device, communicate with the at least one second device based on the updated version of the first user interface information and the first function information, if the updated version of the first user interface information and the first function information is received, and communicate with the at least one second device based on the prestored information, if it is determined that the at least one second device does not include the updated version of the first user interface information and the first function information for controlling the at least one second device, wherein the at least one second device is controlled based on one of the updated version of the first user interface information and the first function information and the original version of the first user interface information and the first function information, the one of the updated version of the first function information and the original version of the first function information controlling at least one function of the at least one second device based on the one of the updated version of the first user interface information and the original version of the first user interface information.

9. The communication system according to claim 8, wherein the original version of the first user interface information and the first function information is prestored in at least one of an internal storage means of the first device and an external storage means associated with the first device, and wherein the internal storage means is a master hard disc drive and the external storage means is a memory area of a personal video recorder.

*10. A master appliance communicating with a slave appliance, comprising:*

*a storage configured to store an original version of user interface information and function information used in communicating with the slave appliance, the stored information corresponding to a previous upload from a memory of the slave appliance; and*

*a master control device configured to*

*confirm a connection with the slave appliance,*

*compare the stored original version information to information stored in the memory of the connected slave appliance to determine whether the information stored in the memory of the slave appliance corresponds to an updated version of user interface information and function information for controlling the slave appliance,*

*receive the updated version of user interface information and function information from the slave appliance, if it is determined that the slave appliance includes the updated version of user interface information and function information for controlling the slave appliance,*

*communicate with the slave appliance based on the updated version of user interface information and function information, if the updated version of user interface information and function information is received, and*

*communicate with the slave appliance based on the stored original version information, if it is determined that the slave appliance does not include the updated version of user interface information and function information for controlling the slave appliance,*

*wherein the slave appliance is controlled based on one of the updated version of user interface information and function information and the original version of user interface information and function information, the one of the updated version of function information and the original version of function information controlling at least one function of the slave appliance based on the one of the updated version of user interface information and the original version of user interface information.*

*11. A method of communicating with a slave appliance, in a master appliance, comprising:*

*storing an original version of user interface information and function information used in communicating with the slave appliance, the stored information corresponding to a previous upload from a memory of the slave appliance;*

*comparing the stored original version information to information stored in the memory of the connected slave appliance to determine whether the information stored in the memory of the slave appliance corresponds to an updated version of user interface information and function information for controlling the slave appliance;*

*receiving the updated version of user interface information and function information from the slave appliance, if it is determined that the slave appliance includes the updated version of user interface information and function information for controlling the slave appliance;*

*communicating with the slave appliance based on the updated version of user interface information and function information, if the updated version of user interface information and function information is received; and*

*communicating with the slave appliance based on the stored original version information, if it is determined that the slave appliance does not include the updated version of user interface information and function information for controlling the slave appliance,*

*wherein the slave appliance is controlled based on one of the updated version of user interface information and function information and the original version of user interface information and function information, the one of the updated version of function information and the original version of function information controlling at least one function of the slave appliance based on the one of the updated version of user interface information and the original version of user interface information.*

*12. A slave appliance communicating with a master appliance, comprising:*

*a storage configured to store user interface information and function information used in communicating with the master appliance; and*

*a slave control device configured to*

*send the stored user interface information and function information to the master appliance according to a request of the master appliance, wherein the request*

*of the master appliance is provided after comparing, in the master appliance, the stored information in the slave appliance to stored information in the memory of the master appliance to determine whether the stored information in the slave appliance corresponds to an updated version of user interface information and function information for controlling the slave appliance,*

*communicate with the master appliance based on the updated version of user interface information and function information, if the stored information in the storage corresponds to the updated version of user interface information and function information, and*

*communicate with the master appliance based on an original version of user interface information and function information that is stored in the master appliance, if it is determined that the slave appliance does not include the updated version of user interface information and function information for controlling the slave appliance,*

*wherein the slave appliance is controlled based on one of the updated version of user interface information and function information and the original version of user interface information and function information, the one of the updated version of function information and the original version of function information controlling at least one function of the slave appliance based on the one of the updated version of user interface information and the original version of user interface information.*

*13. A method of communicating with a master appliance, in a slave appliance, comprising:*

*storing user interface information and function information used in communicating with the master appliance;*

*sending the stored user interface information and function information to the master appliance according to a request of the master appliance, wherein the request of the master appliance is provided after comparing, in the master appliance, the stored information in the slave appliance to stored information in the memory of the master appliance to determine whether the stored information in the slave appliance corresponds to an updated version of user interface information and function information for controlling the slave appliance;*

*communicating with the master appliance based on the updated version of user interface information and function information, if the stored information in the storage corresponds to the updated version of user interface information and function information; and*

*communicating with the master appliance based on an original version of user interface information and function information that is stored in the master appliance, if it is determined that the slave appliance does not include the updated version of user interface information and function information for controlling the slave appliance,*

*wherein the slave appliance is controlled based on one of the updated version of user interface information and function information and the original version of user interface information and function information, the one of the updated version of function information and the original version of function information controlling at least one function of the slave appliance based on the one of the updated version of user interface information and the original version of user interface information.*

*14. A master appliance communicating with a slave appliance, comprising:*

*a storage configured to store first information including first user interface information and first function information used in communicating with the slave appliance; and*

*a master control device configured to*

*confirm a connection with the slave appliance,*

*compare the stored first information to second information including second user interface information and second function information stored in a memory of the connected slave appliance, to determine whether the second information stored in the memory of the slave appliance corresponds to an updated version of first user interface information and first function information for controlling the slave appliance,*

*receive the second information including second user interface information and second function information from the slave appliance, if it is determined that the slave appliance includes the second information for controlling the slave appliance,*

*communicate with the slave appliance based on the received second information including second user interface information and second function information, if the second information is received, and*

*communicate with the slave appliance based on the stored first information, if it is determined that the connected slave appliance does not include the updated version of first user interface information and first function information for controlling the slave appliance,*

*wherein the slave appliance is controlled based on one of the first information and the second information, the one of the first function information and the second function information controlling at least one function of the slave appliance based on the one of the first user interface information and the second user interface information.*

*15. A method of communicating with a slave appliance, in a master appliance, comprising:*

*storing first information including first user interface information and first function information used in communicating with the slave appliance;*

*comparing the stored first information to second information including second user interface information and second function information stored in a memory of the connected slave appliance, to determine whether the second information stored in the memory of the slave appliance corresponds to an updated version of first user interface information and first function information for controlling the slave appliance;*

*receiving the second information including second user interface information and second function information from the slave appliance, if it is determined that the slave appliance includes the second information for controlling the slave appliance;*

*communicating with the slave appliance based on the received second information including second user interface information and second function information, if the second information is received; and*

*communicating with the slave appliance based on the stored first information, if it is determined that the connected slave appliance does not include the updated version of first user interface information and first function information for controlling the slave appliance,*

*wherein the slave appliance is controlled based on one of the first information and the second information, the one of the first function information and the second function information controlling at least one function of the slave*

*appliance based on the one of the first user interface information and the second user interface information.*

*16. A slave appliance communicating with a master appliance, comprising:*

*a storage configured to store second information including second user interface information and second function information used in communicating with the master appliance; and*

*a slave control device configured to*

*send the second information including second user interface information and second function information to the master appliance according to a request of the master appliance, wherein the request of the master appliance is provided after comparing, in the master appliance, the second information stored in the slave appliance to first information stored in the memory of the master appliance to determine whether the second information stored in the slave appliance corresponds to an updated version of first information including first user interface information and first function information for controlling the slave appliance,*

*communicate with the master appliance based on the second information including second user interface information and second function information, if it is determined that the second information stored in the storage corresponds to the updated version of first information including first user interface information and first function information stored in the memory of the master appliance, and*

*communicate with the master appliance based on the first information including first user interface information and first function information, if it is determined that the slave appliance does not include the updated version of first information including first user interface information and first function information for controlling the slave appliance,*

*wherein the slave appliance is controlled based on one of the first information and the second information, the one of the first function information and the second function information controlling at least one function of the slave appliance based on the one of the first user interface information and the second user interface information.*

*17. A method of communicating with a master appliance, in a slave appliance, comprising:*

*storing second information including second user interface information and second function information used in communicating with the master appliance;*

*sending the second information including second user interface information and second function information to the master appliance according to a request of the master appliance, wherein the request of the master appliance is provided after comparing, in the master appliance, the second information stored in the slave appliance to first information stored in the memory of the master appliance to determine whether the second information stored in the slave appliance corresponds to an updated version of first information including first user interface information and first function information for controlling the slave appliance;*

*communicating with the master appliance based on the second information including second user interface information and second function information, if it is determined that the second information stored in the storage corresponds to the updated version of first information including first user interface information and first function information stored in the memory of the master appliance; and*

*communicating with the master appliance based on the first information including first user interface information and first function information, if it is determined that the slave appliance does not include the updated version of first information including first user interface information and first function information for controlling the slave appliance,*

*wherein the slave appliance is controlled based on one of the first information and the second information, the one of the first function information and the second function information controlling at least one function of the slave appliance based on the one of the first user interface information and the second user interface information.*

*18. A master appliance communicating with a slave appliance, comprising:*

*a storage configured to store information; and*

*a master control device configured to*

*confirm a connection with the slave appliance,*

*receive an updated version of user interface information and function information from the connected slave appliance and upload the received updated version of user interface information and function information to the storage, if it is determined that the slave appliance includes the updated version of user interface information and function information for controlling the slave appliance, and*

*communicate with the slave appliance based on the updated version of user interface information and function information, if the updated version of user interface information and function information is received,*

*wherein the slave appliance is controlled based on the updated version of user interface information and function information, the updated version of function information controlling at least one function of the slave appliance based on the updated version of user interface information.*

*19. A method of communicating with a slave appliance, in a master appliance, comprising:*

*confirming a connection with the slave appliance;*

*receiving an updated version of user interface information and function information from the connected slave appliance, if it is determined that the slave appliance includes the updated version of user interface information and function information for controlling the slave appliance;*

*uploading the received updated version of user interface information and function information to the storage; and*

*communicating with the slave appliance based on the updated version of user interface information and function information, if the updated version of user interface information and function information is received,*

*wherein the slave appliance is controlled based on the updated version of user interface information and function information, the updated version of function information controlling at least one function of the slave appliance based on the updated version of user interface information.*

*20. A slave appliance communicating with a master appliance, comprising:*

*a storage configured to store user interface information and function information used in communicating with the master appliance; and*

*a slave control device configured to*

*send the stored user interface information and function information to the master appliance when the slave appliance is connected with the master appliance and the stored user interface information and function information in the storage of the slave appliance corresponds to an updated version of user interface information and function information that is stored in the master appliance,*

*communicate with the master appliance based on the updated version of user interface information and function information, after the master appliance receives the updated version of user interface information and function information from the slave appliance,*

*wherein the slave appliance is controlled based on the updated version of user interface information and function information, the updated version of function information controlling at least one function of the slave appliance based on the updated version of user interface information.*

*21. A method of communicating with a master appliance, in a slave appliance, comprising:*

*storing user interface information and function information used in communicating with the master appliance;*

*sending the stored user interface information and function information to the master appliance when the slave appliance is connected with the master appliance and the stored user interface information and function information in the storage of the slave appliance corresponds to an updated version of user interface information and function information that is stored in the master appliance; and*

*communicating with the master appliance based on the updated version of user interface information and function information, after the master appliance receives the updated version of user interface information and function information from the slave appliance,*

*wherein the slave appliance is controlled based on the updated version of user interface information and function information, the updated version of function information controlling at least one function of the slave appliance based on the updated version of user interface information.*

* * * * *